United States Patent
Hagiwara et al.

(10) Patent No.: US 9,434,167 B2
(45) Date of Patent: Sep. 6, 2016

(54) SEAL MEMBER, LIQUID DISCHARGE HEAD HAVING THE SAME, AND LIQUID DISCHARGE APPARATUS

(71) Applicant: Seiko Epson Corporation, Tokyo (JP)

(72) Inventors: Hiroyuki Hagiwara, Matsumoto (JP); Hiroshige Owaki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/963,328

(22) Filed: Dec. 9, 2015

(65) Prior Publication Data

US 2016/0167384 A1 Jun. 16, 2016

(30) Foreign Application Priority Data

Dec. 11, 2014 (JP) ................................. 2014-250977

(51) Int. Cl.
*B41J 2/165* (2006.01)
*F16J 15/02* (2006.01)

(52) U.S. Cl.
CPC .............. *B41J 2/165* (2013.01); *F16J 15/021* (2013.01)

(58) Field of Classification Search
CPC ................................ B41J 2/165; F16J 15/021
See application file for complete search history.

(56) References Cited

U.S. PATENT DOCUMENTS

| 2005/0122380 A1 | 6/2005 | Nakamura et al. | |
| 2010/0208009 A1* | 8/2010 | Kanaya | B41J 2/1612 347/85 |
| 2012/0293585 A1* | 11/2012 | Hanagami | B41J 2/17523 347/47 |
| 2013/0327852 A1* | 12/2013 | Hara | B41J 2/19 239/553 |

FOREIGN PATENT DOCUMENTS

| JP | 2004-268398 A | 9/2004 |
| JP | 2005-161762 A | 6/2005 |
| JP | 2012-240209 A | 12/2012 |

* cited by examiner

*Primary Examiner* — Manish S Shah
*Assistant Examiner* — Roger W Pisha, II

(57) ABSTRACT

A seal member to be arranged between a first member having a first flow channel and a second member having a second flow channel, including: an elastic portion formed of an elastically deformable first material and including at least a communicating portion provided with a communicating hole which communicates a first flow channel and a second flow channel; and a main body portion formed of a second material having higher liquid-resistant properties than the first material and configured to surround the elastic portion in a state in which at least a flow channel seal surface of the communicating portion is exposed.

20 Claims, 8 Drawing Sheets

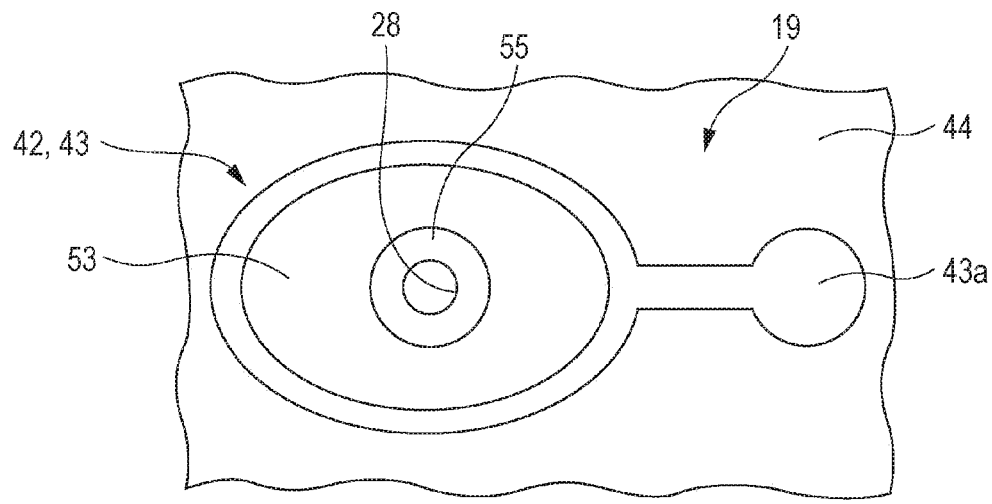
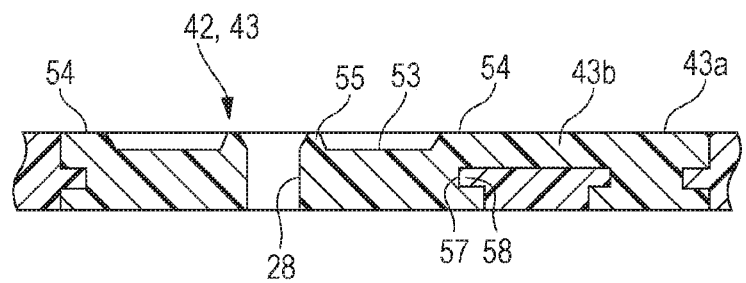
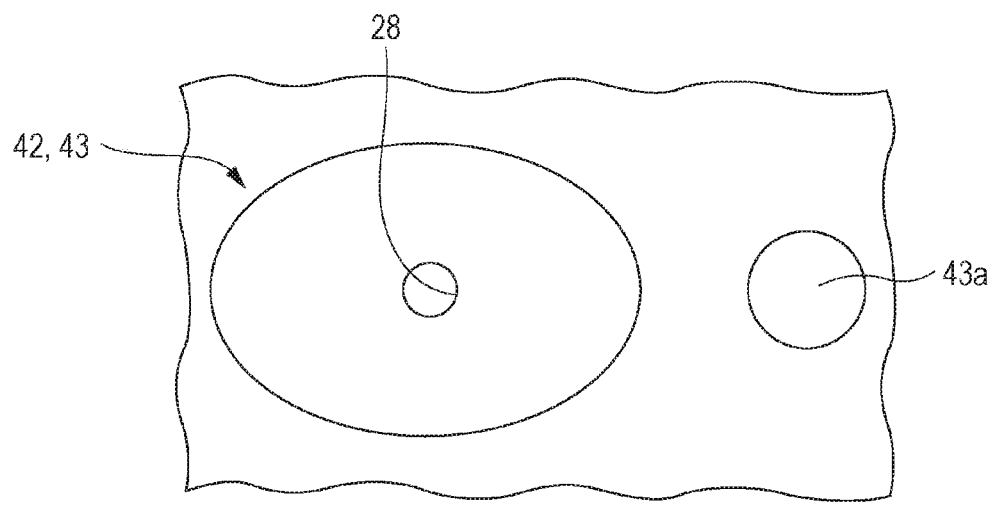

SEAL MEMBER, LIQUID DISCHARGE HEAD HAVING THE SAME, AND LIQUID DISCHARGE APPARATUS

CROSS-REFERENCE TO RELATED APPLICATIONS

This application claims priority to Japanese Patent Application No. 2014-250977 filed on Dec. 11, 2014. The entire disclosure of Japanese Patent Application No. 2014-250977 is hereby incorporated herein by reference.

BACKGROUND

1. Technical Field

The present invention relates to a seal member configured to communicate flow channels in a liquid-tight manner, a liquid discharge head having the seal member, and a liquid discharge apparatus.

2. Related Art

Examples of a liquid discharge head include an ink jet recording head used for an image recording apparatus such as an ink jet recording apparatus. In recent years, however, the liquid discharge head is applied to various manufacturing apparatuses by making full use of such a feature that liquid of a very small amount can be landed accurately onto a predetermined position.

For example, the liquid discharge head is applied to display manufacturing apparatuses configured to manufacture color filters such as liquid-crystal displays, electrode forming apparatuses configured to form electrodes for organic EL (Electro Luminescence) displays and FEDs (Face Emitting Displays), Chip manufacturing apparatuses configured to manufacture biochips. Recording heads for the image recording apparatuses are configured to discharge liquid-state ink, and color material discharging heads for the display manufacturing apparatuses are configured to discharge solutions of color materials in R (red), G (green), and B (blue). Electrode material discharge heads for the electrode forming apparatuses discharge liquid-state electrode material, and bioorganic substance discharge heads for chip manufacturing apparatuses discharge bioorganic substance solution.

Examples of such a liquid discharge head include a configuration in which a plurality of components are stacked one on top of another. The liquid discharge head in this configuration includes a seal member configured to make ink flow channels formed on the components communicate with each other (for example, see JP-A-2012-240209). The seal member achieves sealing properties (that is, liquid-tight properties) between the flow channels by coming into tight contact with an opening rims of the flow channels. Therefore, in general, the seal member is formed of an elastic material such as elastomer. The seal member configured as described above is used not only in the liquid discharge head but preferably also for sealing members having the liquid flow channels with each other.

The seal member formed of a material containing a plasticizer for providing elasticity like elastomer, and butyl rubber, and the like gradually loses the plasticizer in a course of being used depending on the type of liquid (for example, solvent ink) passing therethrough, and, meanwhile, the plasticizer is replaced by ink or the like. Consequently, the ink or the like penetrated in the seal member volatilizes, for example, when exposed to a high-temperature and dry environment, and dimensions of the seal member is contracted as a whole, which could lead to misalignment of communicating holes of the seal member with respect to the flow channels to be sealed. As a result, flow channels may be clogged, or liquid may leak due to an impairment of sealing properties.

SUMMARY

An advantage of some aspects of the invention is to provide a seal member which ensures sealing properties further reliably by reducing a dimensional change, a liquid discharge head having the seal member, and a liquid discharge apparatus.

Means 1

The invention provides a seal member to be arranged between a first member having a first flow channel and a second member having a second flow channel, including: an elastic portion formed of an elastically deformable first material, and including at least a communicating portion provided with a communicating hole configured to make the first flow channel and the second flow channel communicate with each other; and a main body portion formed of a second material having higher liquid-resistant properties than that of the first material and configured to surround the elastic portion in a state in which at least a flow channel seal surface of the communicating portion is exposed.

According to the invention, a dimensional change of the seal member as a whole is reduced irrespective of the type of the used liquid (the liquid passing through the communicating holes), which ensures the sealing properties further reliably. In other words, even though the plasticizer contained in the material of the elastic portion is lost gradually due to contact with the liquid, the plasticizer is replaced by the ink or the like. In addition, since a periphery of the elastic portion is surrounded by the main body portion having high liquid-resistant properties, the replaced liquid is unlikely to be volatilized from the elastic portion. Even though the liquid contained in the elastic portion is volatilized, since the periphery of the elastic portion is surrounded by the main body portion, the dimensional change of the elastic portion is restricted. Therefore, an occurrence of misalignment of the communicating holes with respect to the first flow channel and the second flow channel is prevented. Consequently, the sealing properties between the flow channels may be enhanced irrespective of the type of the used liquid.

Means 2

In the configuration described in Means 1, further preferably, a configuration in which the second material of the main body portion has rigidity higher than that of the first material of the elastic portion is employed.

In this configuration, the dimensional change of the elastic portion is prevented further reliably.

Means 3

In the configuration described in Means 2, a configuration in which the main body portion preferably includes a plurality of the elastic portions, and surrounds the elastic portions individually may be employed.

In this configuration, the main body portion surrounds each of the elastic portions individually, so that the positional misalignment of the communicating holes due to the dimensional change of the individual elastic portion may be effectively restrained.

Means 4

Preferably, the configuration described in any one of Means 1 to Means 3 described above further includes two or more reference portions each having a reference hole, which serves as a reference for positioning of the sealing member are provided, and the reference portions are formed of the first material.

In this configuration, by forming the reference portions provided with the reference hole of the first material having elasticity such as elastomer, in the case of performing positioning of the seal member by inserting a positioning pin, which is configured to define an orientation of the seal member, into the reference hole, generation of foreign substances such as shavings due to scraping between an inner periphery of the reference hole and the positioning pin may be reduced in comparison with a case where the reference portions are formed of a harder material. Therefore, likelihood of entry of the foreign substance into the flow channels is reduced.

Means 5

In the configuration described in Means 4 described above, a configuration in which at least part of an outer dimension of the reference portions on a first surface side, which is a side on which the positioning pin is inserted into the reference hole, is preferably set to be larger than an outer dimension on a second surface side, which is opposite to the first surface, may be employed.

In this configuration, part of the reference portion which is set to have a large outer dimension functions as a retainer with respect to the main body portion and prevents separation of the reference portion from the main body portion.

Means 6

In the configuration of Means 5 described above, preferably, a configuration in which the reference portion includes a reference hole portion provided with the reference hole, and an extending portion continuing from the reference hole portion, and the extending portion is arranged on the first surface side is employed.

In this configuration, since the extending portion functions as the retainer of the reference portion with respect to the main body portion, separation of the reference portions from the main body portion is prevented.

Means 7

In the configuration of any one of Means 4 to Means 6 described above, a configuration in which the main body portion is provided with a void portion to which allows a mount reference portion, configured to define the orientation of the seal member can be fitted therein, at a position biased to one side in a direction of arrangement of the reference holes may be employed.

In this configuration, by fitting the mount reference portion into the void portion and inserting the positioning pin into the reference hole, the seal member is arranged at a correct position in a correct orientation between the first member and the second member. Accordingly, efficiency of a mounting operation is improved.

Means 8

In the configuration from Means 1 to Means 7 described above, a configuration in which a boundary between the communicating portion and the main body portion has a circular shape in plan view is preferably employed.

In this configuration, since the communicating portion is formed into a circular shape in plan view, even when dimensional contraction occurs, likelihood of deflection in shape is reduced. Therefore, an adverse effect in dimensional change of the elastic portion may is reduced.

Means 9

In a configuration according to any one of Means 1 to Means 8 described above, a configuration in which one of the elastic portion and the main body portion is provided with a fitting portion, and the other one of the elastic portion and the main body portion is provided with a fitted portion to allow a fit of the fitting portion at a boundary between the elastic portion and the main body portion is preferably employed.

In this configuration, likelihood of separation of the elastic portion from the main body portion is reduced by the fit between the fitting portion and the fitted portion.

Means 10

In the configuration described in Means 9, a configuration in which the communicating portion includes a thin portion having a thickness smaller than a thickness of an opening rim of the communicating hole and surrounding the periphery of the opening rim, and an outer peripheral portion having a thickness larger than the thickness of the thin portion and surrounding the periphery of the thin portion, and the fitting portion or the fitted portion is formed on the outer peripheral portion is preferably employed.

In this configuration, by forming the fitted portion or the fitting portion on the outer peripheral portion having a sufficient thickness for forming the fitted portion or the fitting portion, the thickness of the thin portion may be reduced. Since the thickness of the opening rim configured to ensure the sealing properties may be reduced correspondingly, the entire thickness of the elastic portion may be reduced. This configuration contributes to a reduction in weight and size, and hence to a reduction in cost.

Means 11

A liquid discharge head of the invention includes the seal member according to any one of Means 1 to Means 10 described above; a first member having a first flow channel; and a second member having a second flow channel.

Means 12

A liquid discharge apparatus of the invention further includes the liquid discharge head of the Means 11 described above.

According to the configuration of Means 11 and Means 12, since the seal member having a configuration in which the dimensional change is reduced irrespective of the type of the used liquid and the sealing properties are reliably secured, an improvement of reliability is achieved.

BRIEF DESCRIPTION OF THE DRAWINGS

The invention will be described with reference to the accompanying drawings, wherein like numbers reference like elements.

FIGS. 9A to 9C are explanatory drawings of a configuration of the portion in the vicinity of the communicating portion of the seal member in a second embodiment.

DESCRIPTION OF EXEMPLARY EMBODIMENTS

Hereinafter, embodiments of the invention will be described with reference to the attached drawings. In the embodiments described below, various definitions are made as preferred specific examples of the invention. However, the scope of the invention is not limited to those examples unless otherwise specifically described. In the following description, an example in which the invention is applied to a seal member 19 configured to seal a flow channel of an ink jet recording head (hereinafter, referred to simply as a recording head 3), which is a type of a liquid discharge head will be exemplified.

Figure 1:
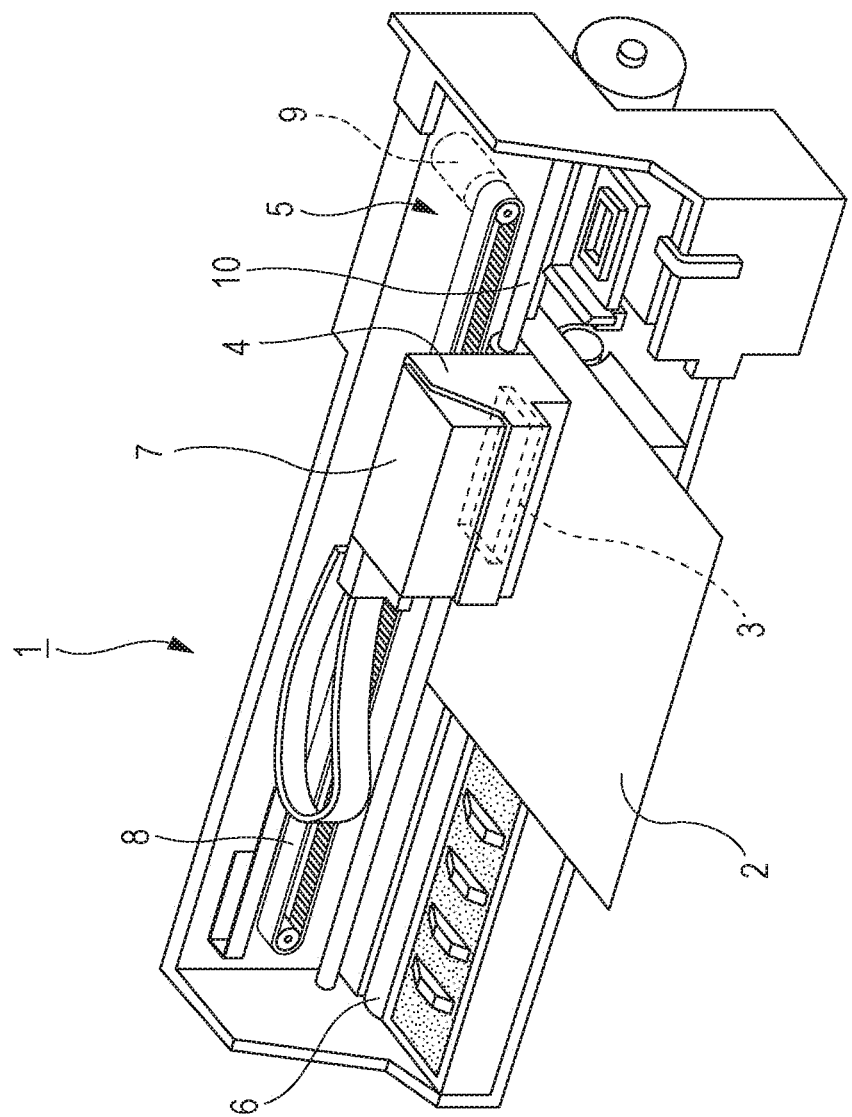
FIG. 1 is an explanatory perspective view of an internal configuration of a printer.

Firstly, a configuration of a printer 1, which is a type of a liquid discharge apparatus, will be described with reference to FIG. 1. The printer 1 is an apparatus configured to record images or the like by discharging liquid-state ink onto a surface of a recording medium 2 such as a recording sheet or a film. The printer 1 is provided with a recording head 3, a carriage 4 on which the recording head 3 is mounted, and a carriage moving mechanism 5 configured to move the carriage 4 in a primary scanning direction. The printer 1 includes a transporting mechanism 6 configured to transport the recording medium 2 in a secondary scanning direction. The transporting mechanism 6 includes a platen roller and a drive motor configured to drive the platen roller. The ink described above is a type of liquid of the invention and is stored in an ink cartridge 7 as a liquid supply source. The ink cartridge 7 is demountably mounted on the recording head 3. A configuration in which the ink cartridge 7 is arranged on the main body of the printer 1 and the ink is supplied from the ink cartridge 7 through an ink supply tube to the recording head 3 may also be employed.

Figure 2:
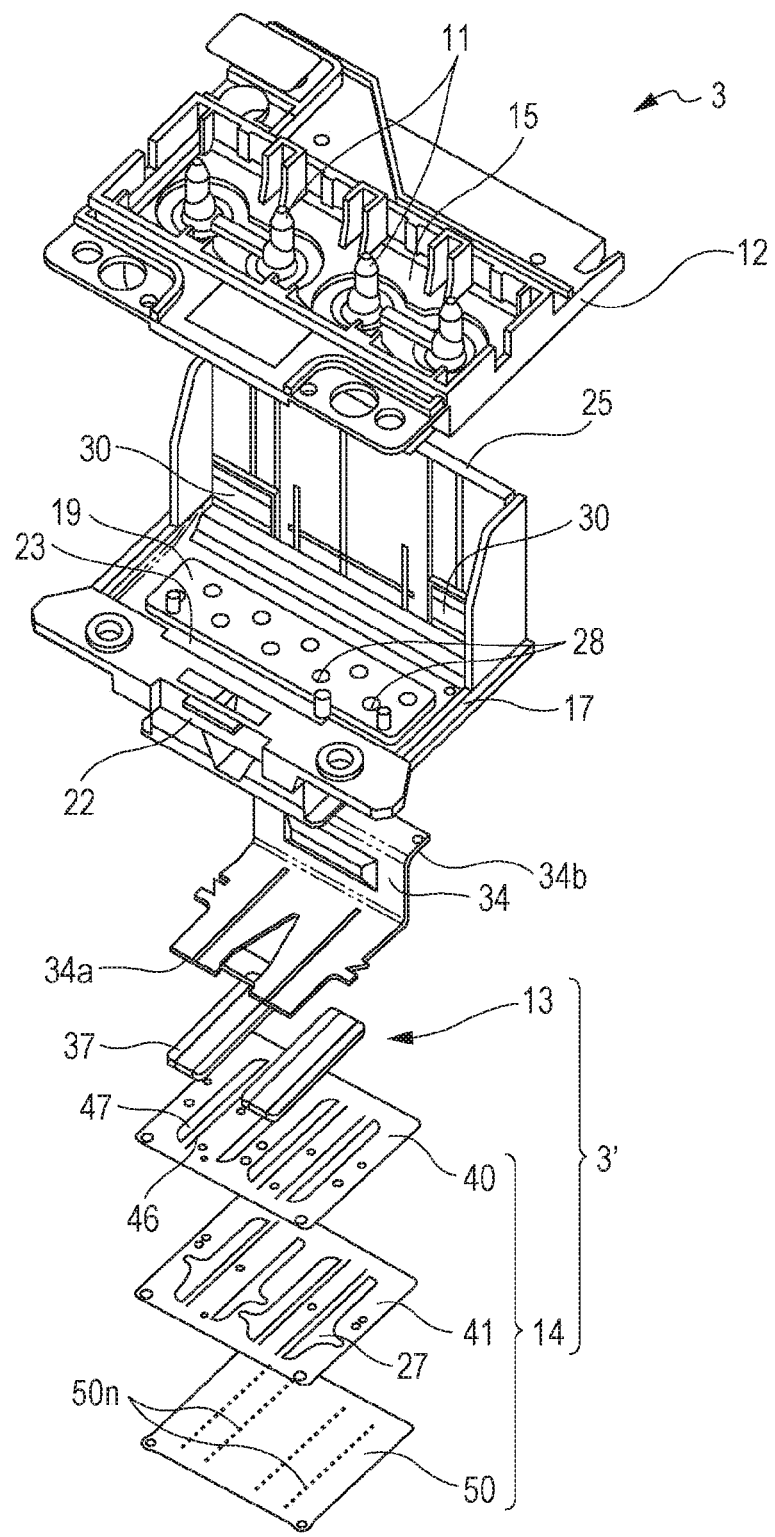
FIG. 2 is an exploded perspective view of a recording head viewing from obliquely above.
Figure 3:
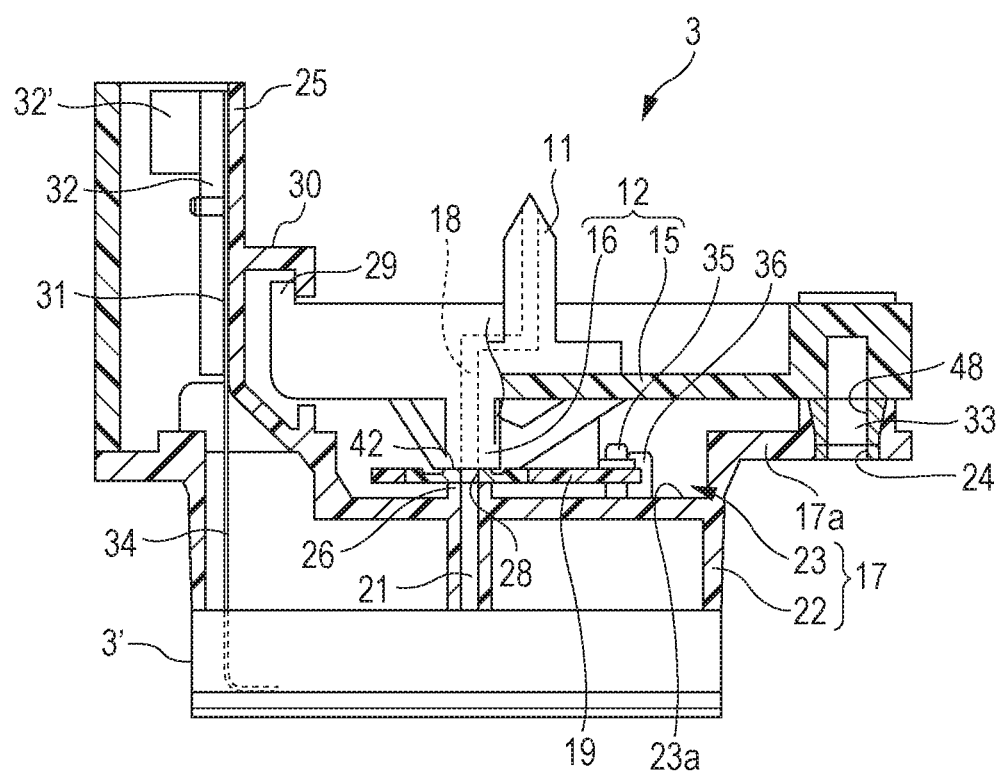
FIG. 3 is a cross-sectional view of a principal portion of the recording head.

FIG. 2 and FIG. 3 are explanatory drawings illustrating a configuration of the recording head 3. FIG. 2 is an exploded perspective view of the recording head 3 viewing from obliquely above. FIG. 3 is a cross-sectional view of the recording head 3. The recording head 3 includes an introducing needle holder 12 having a plurality of ink introducing needles 11 disposed thereon (a type of a first member of the invention), and a head unit 3' including an actuator unit 13 and a flow channel unit 14. The introducing needle holder 12 and the head unit 3' are provided in a case member 17 (a type of a second member of the invention). The introducing needle holder 12 is formed of a synthetic resin such as epoxy resin, and includes a base substrate 15 and a plurality of flow channel connecting portions 16 projecting from a lower surface (a surface on the case member 17 side) of the base substrate 15. The base substrate 15 is a substantially rectangular-shaped plate member in plan view, and includes a plurality of ink introducing needles 11 mounted on the upper surface thereof by the intermediary of a filter, which is not illustrated. Liquid supply sources such as an ink cartridge 7 and a sub-tank (not illustrated) including ink stored therein are mounted on the ink introducing needles 11. Holder flow channels 18 (a type of a first flow channel of the invention) configured to supply the ink introduced from the ink introducing needles 11 toward the case member 17 are formed in the interior of the introducing needle holder 12. An upstream side of the holder flow channels 18 are opened to the upper surface of the base substrate 15 and communicate with the ink introducing needles 11 via a filter, which is not illustrated, and a downstream side of the holder flow channels 18 is opened to a distal end surfaces of the flow channel connecting portions 16 (that is, a surface which comes into contact with lip portions 55 of the seal member 19, which will be described later) as outflow ports.

As illustrated in FIG. 3, engaged portions 29 to be engaged with engaging portions 30 of the case member 17 are provided on one side of the base substrate 15 of the introducing needle holder 12, specifically, on a supporting wall 25 side (described later) of the case member 17 in a mounting state. The case member 17 in the first embodiment is provided with the engaging portions 30 at two positions in total at a distance from each other in a direction of arrangement of the introducing needles (see FIG. 4), and the introducing needle holder 12 is provided with engaged portions 29 at two positions in total corresponding to the engaging portions 30. The introducing needle holder 12 is provided with fitting projections 33 configured to be fitted into positioning holes 24 of the case member 17 on an opposite side to the engaged portions 29 of the introducing needle holder 12 with respect to the flow channel connecting portions 16 so as to project in the same direction as the flow channel connecting portions 16 from a lower surface of the base substrate 15. The fitting projections 33 are formed at two positions in total corresponding to the positioning holes 24 of the case member 17. Screw holes 48 are formed in the interior of the fitting projections 33, and the introducing needle holder 12 is fixed in a state of being relatively positioned with the to the case member 17 by securing members such as securing screws or the like being screwed into (engaged with) the screw holes 48 in a state in which the introducing needle holder 12 is mounted on the case member 17, that is, in a state in which the fitting projections 33 are fitted into the positioning holes 24.

Figure 4:
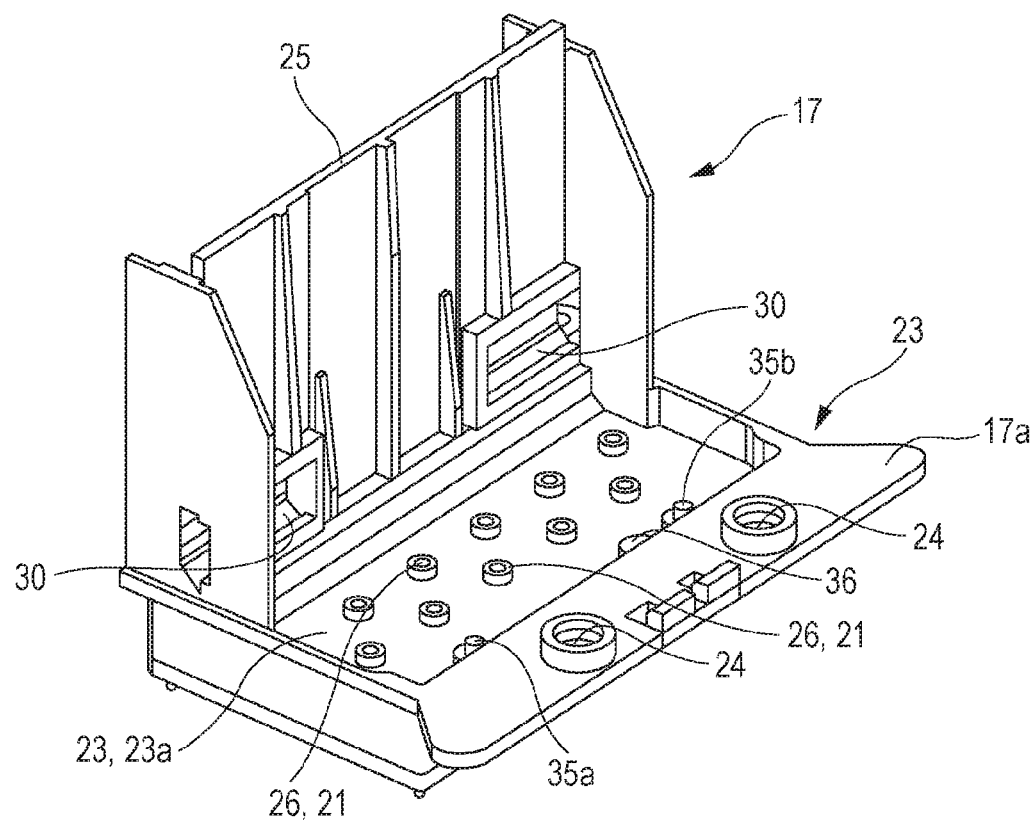
FIG. 4 is an explanatory perspective view of a configuration of a case member.

FIG. 4 is an explanatory perspective view of a configuration of the case member 17. The case member 17 is a hollow box-shaped member formed of a synthetic resin such as epoxy resin, for example, and is a member including a head unit mounting portion 22 (see FIG. 3) on a lower surface side to which the head unit 3' is to be mounted, and a holder mounting portion 23 to which the introducing needle holder 12 is mounted. The holder mounting portion 23 has the supporting wall 25 provided upright so as to extend upward from an edge portion on one side (an opposite side to the head unit mounting portion 22). The engaging portions 30 are formed on an inner side of the supporting wall 25. On the side of the holder mounting portion 23 opposite to the supporting wall 25, an apprentice portion 17a extending sideways (in a direction away from the supporting wall 25) is formed. The apprentice portion 17a is provided with the positioning holes 24 so as to penetrate therethrough in a direction of the thickness thereof. In the first embodiment, two of the positioning holes 24 are arranged on the apprentice portion 17a along a direction of arrangement of the introducing needles.

Case flow channels 21 (which correspond to second flow channels of the invention) are provided in the interior of the case member 17 so as to penetrate therethrough in a height direction. An upstream end of the case flow channels 21 open as inflow ports on distal end surfaces of a cylindrical projecting portions 26 which are one step higher than a mounting surface 23a of a holder mounting portion 23 as illustrated in FIG. 3. Downstream ends of the case flow channels 21 communicate with a common liquid chamber 27 in the flow channel unit 14. Therefore, ink introduced from the ink introducing needles 11 is supplied to the common liquid chamber 27 through the holder flow channels 18, communicating holes 28, and the case flow channels 21, and is distributed to each pressure chamber via the common liquid chamber 27.

A plurality of the projecting portions 26 are formed on the mounting surface 23a of the holder mounting portion 23. In the first embodiment, two rows in total of projecting portions each including five projecting portions 26 are arranged in parallel so that five projecting portions 26 each are arranged in a zigzag pattern. In other words, the mounting surface 23a includes ten projecting portions 26 in total. The positions where the projecting portions 26 are formed correspond to positions of openings of the outflow ports of the flow channel connecting portions 16 formed in the introducing needle holder 12. A seal member 19 described later is arranged on the mounting surface 23a, and the seal member 19 communicates an outflow ports of the holder flow channels 18 of the introducing needle holder 12 and inflow ports of the case flow channels 21 with each other via the communicating holes 28 in a liquid-tight manner, that is, are sealed. A pair of positioning pins 35a and 35b are provided at an edge portion of the mounting surface 23a on the apprentice portion 17a side so as to extend upright at a distance from each other in a direction of arrangement of the projecting portions. The positioning pins 35a and 35b are inserted into reference holes 51a and 51b (described later) provided in the seal member 19, respectively, when arranging the seal member 19 on the mounting surface 23a, and hence the mounting position of the seal member 19 on the mounting surface 23a is defined. Furthermore, the mounting surface 23a is provided with a boss 36 (which corresponds to a mount reference portion of the invention) which indicates a mounting orientation of the seal member 19, and is provided upright at a position biased to one of the positioning pins 35a and 35b, for example, to the positioning pin 35b. Correspondingly, the seal member 19 is provided with a notch 52 (a type of a void portion of the invention) to which the boss 36 can be fitted. The boss 36 is fitted to the notch 52, and the positioning pins 35a and 35b are inserted into the reference holes 51a and 51b to arrange the seal member 19 on the mounting surface 23a in correct orientation and at correct position. In other words, a problem that the seal member 19 is mounted on the mounting surface 23a inside out is prevented. Accordingly, efficiency of a mounting operation of the seal member 19 is improved.

As illustrated in FIG. 3, a substrate mounting surface 31 is provided on a surface of the supporting wall 25 of the case member 17 on the opposite side to the introducing needle holder 12, and a circuit substrate 32 is fixed to the substrate mounting surface 31. The circuit substrate 32 includes electronic components mounted thereon for various drive signals, and a terminal portion to which a flexible cable 34 of the actuator unit 13 is connected. The circuit substrate 32 is also provided with a connector 32', and a control cable such as a FFC (flexible flat cable) and the like from a control device (none of them is illustrated) is electrically connected to the connector 32'. The circuit substrate 32 supplies a drive signal from the control unit of the printer 1 to the actuator unit 13 via the flexible cable 34.

The head unit 3' to be mounted on the head unit mounting portion 22 of the case member 17 includes the actuator unit 13 and the flow channel unit 14 as illustrated in FIG. 2, and are integrated in a stacked manner. The actuator unit 13 is provided with a pressure chamber substrate which defines pressure chambers corresponding to nozzles 50n and piezoelectric elements or the like which are a type of a pressure generating source in a stacked manner. A one-end-side terminal portion 34a of the flexible cable 34 such as a TCP (Tape Carrier Package), a COF (Chip On Film) and the like is electrically connected to the terminal portion 37 of the piezoelectric element in the actuator unit 13. The piezoelectric elements in the first embodiment are piezoelectric elements of, so-called a flexural oscillation mode. When this piezoelectric elements are driven, capacities of the pressure chambers are changed, and hence a pressure change occurs in ink in the pressure chambers. With this pressure change, ink droplets are discharged from the nozzles 50n. Examples of a pressure generating source for causing the ink to be discharged from the nozzles 50n are not limited to the exemplified piezoelectric elements. Instead, for example, various pressure generating sources such as heating elements or electrostatic actuators may be employed.

The flow channel unit 14 includes a supply port plate 40 provided with ink supply ports 46 and compliance portions 47 configured to alleviate the pressure change in the common liquid chamber 27, a common liquid chamber plate 41 provided with a plurality of the common liquid chambers 27 to which ink introduced from the ink cartridge 7 is supplied, and a nozzle plate 50 having nozzle rows including a plurality of nozzles 50n arranged in the recording head 3 in rows in the secondary scanning direction. The supply port plate 40 and the common liquid chamber plate 41 are joined by an adhesive agent in a stacked manner, and form ink flow channels from the common liquid chambers 27 to the nozzles 50n. The nozzle plate 50 is joined to the common liquid chamber plate 41 on an opposite surface to a joint surface with respect to the supply port plate 40.

In the recording head 3 having the configuration described above, for example, in the case where a problem such that ink is not normally discharged from the nozzles 50n due to clogging or the like of the flow channels by air bubbles or ink increased in viscosity or the like, cleaning of the interior of the flow channels can be performed by removing the introducing needle holder 12 and the seal member 19 from the case member 17. Specifically, cleaning is performed by causing a cleaning liquid such as pure water to flow into the flow channels from the nozzles 50n side and to circulate therein, and then to be discharged from the inflow port side of the case flow channels 21. The reason why cleaning is performed in a state in which the introducing needle holder 12 is removed from the case member 17 is to prevent a filter from trapping foreign substances. In this configuration, the recording head 3 requires the seal member 19 configured to communicate the case flow channels 21 of the case member 17 with the holder flow channels 18 of the introducing needle holder 12 in a liquid-tight manner.

Figure 5A:
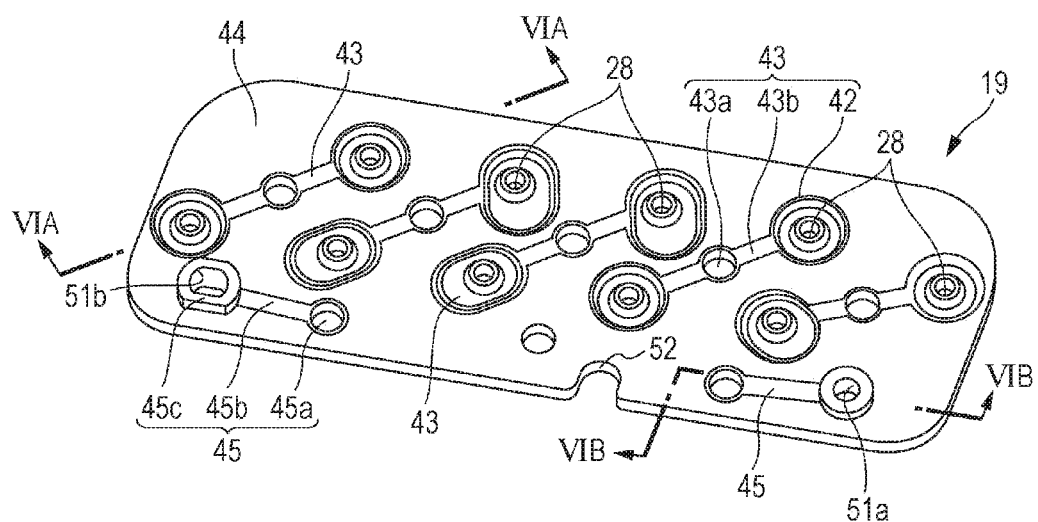
FIGS. 5A and 5B are perspective views of a seal member.
Figure 5B:
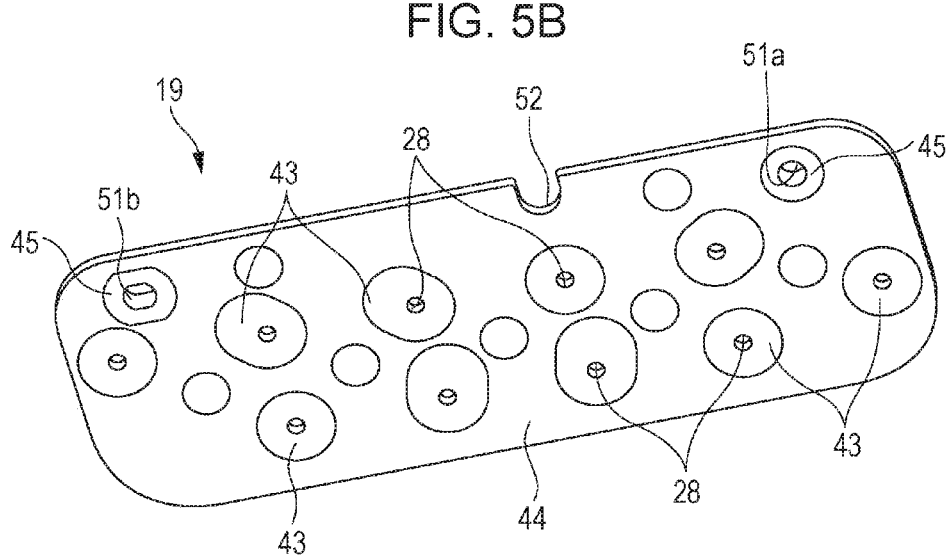
Figure 6A:
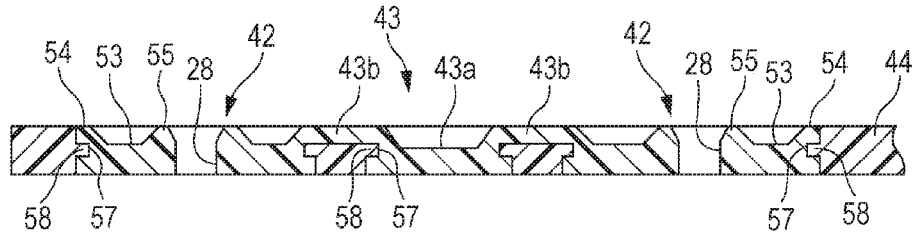
FIG. 6A is a cross-sectional view of the seal member taken along the line VIA-VIA in FIG. 5A.
Figure 6B:
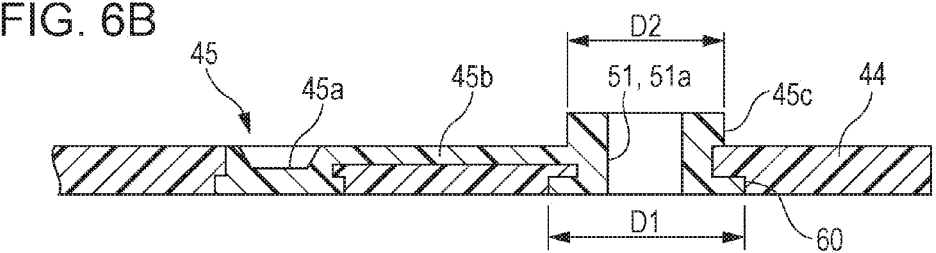
FIG. 6B is a cross-sectional view of the seal member taken along the line VIB-VIB in FIG. 5A.

FIGS. 5A and 5B and FIGS. 6A and 6B are explanatory drawings illustrating a configuration of the seal member 19 interposed between the introducing needle holder 12 and the case member 17. FIG. 5A is a perspective view of the seal member 19 illustrating an upper surface side, and FIG. 5B is a perspective view of the seal member 19 illustrating a lower surface side. FIG. 6A is a cross-sectional view of the seal member 19 taken along the line VIA-VIA in FIG. 5A, and FIG. 6B is a cross-sectional view taken along the line VIB-VIB in FIG. 5A. The seal member 19 is a plate-shaped member including elastic portions 43 each having communicating portions 42 with the communicating hole 28 formed therethrough, reference portions 45 each having a reference hole 51 formed therethrough, and a main body portion 44 configured to retain these elastic portions 43 and the reference portions 45. The elastic portions 43 and the reference portions 45 are formed of an elastic material (a type of a first material of the invention) such as thermoplastic elastomer (for example, olefin-based elastomer or styrene-based elastomer), heat-cured elastomer (for example, butyl rubber, EPDM (Ethylene-Propylene-Diene Rubber)). In contrast, the main body portion 44 is formed of a material having higher liquid-resistant properties and rigidity than the material of the elastic portions 43 or the like (a type of a second material of the invention) such as modified PPE (modified polyphenylene ether), PP (polypropylene), POM (polyacetal), and the like. In the first embodiment, the elastic portions 43 and the reference portions 45 are formed integrally with the main body portion 44 by two-color molding, for example. The lower surface of the seal member 19 on the mounting surface 23a side of the holder mounting portion 23 corresponds to a first surface of the invention, and an upper surface of the introducing needle holder 12 on the flow channel connecting portion 16 side corresponds to a second surface of the invention.

The liquid-resistant properties of each material may be evaluated on the basis of a volume when the material is swelled by being immersed in liquid to be used, which is ink in the first embodiment, and a volume when the material is dry. Specifically, a ratio V2/V1 between a volumes V1 after the material is immersed in a liquid having a temperature of 60° C. for 72 hours and a volume V2 after the material is left unattended for 24 hours and dried under an environment set to a room temperature of 60° C. and a moisture of 10% or lower is obtained. The liquid-resistant properties increase as the ratio V2/V1 gets closer to 1, and decrease as the ratio is reduced more from 1. Therefore, the ratio V2/V1 of modified polypropylene, which is a material of the main body portion 44, is closer to one than the ratio V2/V1 of elastomer, which is a material of the elastic portions 43 and the reference portions 45.

The elastic portions 43 in the first embodiment each include a gate portion 43a corresponding to a gate of a metal mold at the time of injection molding, bridge portions 43b extending in opposite directions from the gate portion 43a, and the communicating portions 42 provided at ends of the bridge portions 43b opposite to the gate portion 43a. In other words, the elastic portions 43 of the first embodiment each include two of the communicating portions 42. The communicating portions 42 are portions formed into a true circle or an ellipse in plan view, and each include the communicating hole 28 at a center portion thereof so as to penetrate in a plate-thickness direction. Upper and lower surfaces of the communicating portion 28 correspond to seal surfaces which seal the flow channels. As illustrated in FIG. 6A, thin portions 53 having a thickness thinner than the thickness of opening rims and surrounding the periphery of the opening rims are formed in the peripheries of the opening rims of the communicating holes 28 on the upper surface side. The thin portions 53 are portions depressed from the upper surface side to the lower surface side of the elastic portions 43. The thin portions 53 function as reliefs which avoid interference with the flow channel connecting portions 16. Therefore, the opening rims on entry ports side of the communicating holes 28 (that is, on the flow channel connecting portions 16 side) correspond to lip portions 55 swelled from the thin portions 53. In addition, outer peripheral portions 54 having a ring shape in plan view, which is larger than the thickness of the thin portions 53, and surrounds the peripheries of the thin portions 53, are formed outside the thin portions 53. In the first embodiment, the thickness of the opening rim of the communicating holes 28 and the thickness of the outer peripheral portions 54 are set to be equal to the thickness of the main body portion 44.

The outer peripheries of the gate portions 43a and the communicating portions 42, that is, portions corresponding to the boundaries with respect to the main body portion 44 are provided with groove-shaped fitted portions 57 depressed inward. The fitted portions 57 are formed on the outer peripheral portions 54 of the communicating portions 42 over the entire circumferences of the outer peripheral surfaces other than the connecting portions with respect to the bridge portions 43b in the middle (substantially center) in the direction of thickness of the outer peripheral portions 54. In the same manner, the gate portions 43a are provided with the fitted portions 57 on the outer peripheral surfaces other than the connecting portions with respect to the bridge portions 43b. The fitted portions 57 are portions in which flange-shaped fitting portions 58 provided at the boundaries with respect to the elastic portions 43 of the main body portion 44. Likelihood of separation of the elastic portion 43 from the main body portion 44 is reduced by a fit between the fitting portion 58 and the fitted portion 57. A configuration in which the fitting portions 58 are formed on the outer peripheries of the gate portions 43a and the communicating portions 42, and the fitted portions 57 are formed on the main body portion 44 is also applicable.

Figure 7:
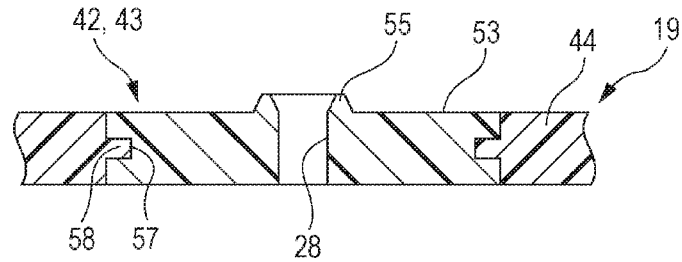
FIG. 7 is a cross-sectional view of the principal portion of the seal member in a comparative example.

As a comparative example illustrated in FIG. 7, in the case where the fitted portions 57 (or the fitting portions 58) of the communicating portions 42 are formed in a configuration in which the communicating portions 42 are not provided with the outer peripheral portions 54 (in other words, a configuration in which the thin portions 53 are not provided), the thickness is corresponding thereto is required, and thus the thickness of the elastic portions 43 as a whole is increased. In contrast, by forming the fitted portions 57 on the outer peripheral portions 54 having a sufficient thickness for forming the fitted portions 57 (or the fitting portions 58), the thickness of the thin portions 53 may be reduced. Since the thickness of the lip portions 55 configured to ensure the sealing properties may be reduced, the entire thickness of the entire elastic portions 43 may be reduced. As a result, this configuration contributes to a reduction in weight and size, and hence to a reduction in cost.

The reference portions 45 of the first embodiment each include a gate portion 45a, a bridge portion 45b (which corresponds to an extending portion of the invention) extending sideward from the gate portion 45a (that is, continuing from the gate portion 45a), and a reference hole portion 45c provided at the end on the opposite side to the gate portions 45a of the bridge portions 45b. The reference hole portion 45c has a substantially cylindrical shape and include a reference hole 51 formed at a center portion thereof. As illustrated in FIG. 6B, the reference hole portion 45c have a larger thickness than the thickness of the gate portion 45a and the main body portion 44, and project partly on the upper surface of the main body portion 44. In the reference portions 45, at least part of an outer dimension of the first surface side, which is a side on which the positioning pins 35 are inserted into the reference holes 51, is preferably set to be larger than an outer dimension on the second surface side, which is opposite to the first surface. In other words, in the first embodiment, annular shaped flange portions 60 are formed on the lower surfaces of the reference hole portions 45c, and an outer diameter D1 of the flange portions 60 is set to be larger than an outer diameter D2 of the reference hole portions 45c on the upper surface side. Accordingly, when the positioning pins 35 are inserted (press-fitted) into the reference holes 51, the flange portions 60 set to be larger than the dimension on the upper surface side function as a retainer with respect to the main body portion 44, and the reference portions 45 are prevented from separating from the main body portion 44.

As illustrated in FIGS. 5A and 5B, the reference hole 51a which is one of a pair of the reference holes 51a and 51b of the reference portions 45 is formed into a true circle in plan view and matched with the outer diameter of the positioning pin 35. In contrast, the other reference hole 51b is formed into an elongate hole having a long inner dimension in a direction of arrangement of the positioning holes than the diameter of the positioning pin 35. In other words, by employing the elongate hole as the other reference hole 51b, an error in distance between the positioning pins 35 of the holder mounting portion 23 may be absorbed by the elongate hole. In addition, by forming the reference portions 45 provided with the reference holes 51 of the elastic material such as elastomer, foreign substances such as shavings generated when the positioning pins 35 are inserted into the reference holes 51, and the inner peripheries of the reference holes 51 and the positioning pins 35 scrape may be reduced in comparison with the case where the reference portions 45 are formed of a harder material. Therefore, likelihood of entry of the foreign substance into the flow channels is reduced.

The main body portion 44 is formed into an elongated shape in the direction of arrangement of the ink introducing needles 11, and includes a plurality, five in the first embodiment, of the elastic portions 43 in an independent manner. More specifically, the main body portion 44 retains these elastic portions 43 in a state of exposing part of the communicating portions 42 to the upper surface or the lower surface thereof, that is, in a state of exposing flow channel seal surfaces of the communicating portions 42, and also in the state of surrounding the outer peripheries of the elastic portions 43. The main body portion 44 retains a pair of the reference portions 45 in a state of surrounding the outer peripheries thereof in the same manner as the elastic portions 43 so as to be arranged in a longitudinal direction in areas which does not interfere with the elastic portions 43. One of the long sides of the main body portion 44 is provided with the notch 52 which can fit the boss 36 described above. Any device which allows fitting of the boss 36 may be used instead of the notch, and a void portion such as a through hole is also applicable.

Figure 8:
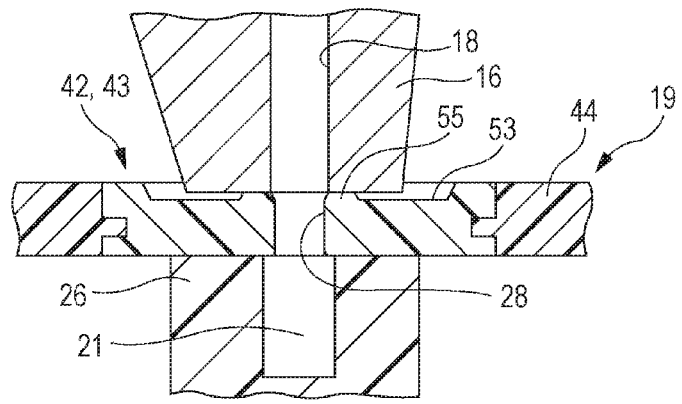
FIG. 8 is a cross-sectional view of a portion in the vicinity of a communicating portion of the seal member illustrating a sealed state between a holder flow channel and a case flow channel.

In order to mount the introducing needle holder 12 to the case member 17, the seal member 19 is arranged in position on the case member 17 so that the positions of the case flow channels 21 opening to distal end surfaces of the projecting portions 26 and the communicating holes 28 on a plane are aligned. Specifically, the boss 36 of the case member 17 is fitted to the notch 52 of the main body portion 44 of the seal member 19, and the positioning pins 35a and 35b of the case member 17 are inserted into the reference holes 51a and 51b of the seal member 19, respectively, so that the seal member 19 is arranged in a state of being positioned on the mounting surface 23a. The fitting projections 33 are then fitted into the positioning holes 24 of the case member 17 in a state in which the engaged portions 29 of the introducing needle holder 12 engages the engaging portions 30 provided on the supporting wall 25 of the case member 17. As illustrated in FIG. 8, the opening rims of the holder flow channels 18 at the distal end surfaces of the flow channel connecting portions 16 of the introducing needle holder 12 come into contact with the lip portions 55 of the flow channel seal surfaces of the communicating portions 42 of the seal member 19, and the opening rims of the case flow channels 21 at the projecting portions 26 of the case member 17 come into contact with the flow channel seal surface on the opposite side to the lip portions 55 of the communicating portions 42. Securing members, which are not illustrated, such as securing screws are inserted into the positioning holes 24 from below of the apprentice portion 17a and are screwed into the screw holes 48 in a state in which the fitting projections 33 are fitted into the positioning holes 24. Accordingly, the introducing needle holder 12 is fixed to the case member 17 in a state in which the lip portions 55 of the communicating portions 42 interposed between the flow channel connecting portions 16 and the projecting portions 26 are compressed by the distal end surfaces of the flow channel connecting portions 16. Accordingly, the holder flow channels 18 and the case flow channels 21 communicate with each other via the communicating holes 28 in a liquid-tight manner. In other words, the holder flow channels 18 and the case flow channels 21 are sealed by the seal member 19.

By employing the seal member 19 of the invention, a dimensional change of the seal member 19 as a whole is reduced irrespective of the type of the used liquid (the liquid passing through the communicating holes 28), whereby the sealing properties are ensured further reliably. In other words, even though the plasticizer contained in elastomer, which is the material of the elastic portions 43, is gradually lost due to contact with the liquid such as ink, the plasticizer is replaced by the ink or the like, and in addition, since the peripheries of the elastic portions 43 are surrounded by the main body portion 44 having high liquid-resistant properties and rigidity, the replaced ink and the like is unlikely to volatilized from the elastic portions 43. Even though the liquid contained in the elastic portions 43 is volatilized, since the peripheries of the elastic portions 43 are surrounded by the main body portion 44, which is not much subject to the dimensional change, the dimensional change of the elastic portions 43 is restricted. Therefore, an occurrence of misalignment of the communicating holes 28 with respect to the case flow channels 21 and the holder flow channels 18 is prevented. Consequently, the sealing properties between the flow channels may be enhanced irrespective of the type of the used liquid. Particularly like the solvent-based ink, the seal member of the invention is preferable in a configuration in which liquid which has a strong aggression with respect to the elastic portions 43 (which causes the plasticizer to be lost easily from the elastic portions 43).

In the first embodiment, since the communicating portions 42 of the elastic portions 43 are formed into a circular or ellipse shape in plan view, even when dimensional contraction occurs, likelihood of deflection in shape is reduced. Therefore, an adverse effect in dimensional change of the elastic portions 43 is restricted.

In addition, the seal member 19 includes a plurality of elastic portions 43, and the main body portion 44 surrounds each of the elastic portions 43 individually, so that the positional misalignment due to the dimensional change of the individual communicating portions 42 may be effectively restrained.

In the recording head 3 of the invention and the printer 1 including the recording head 3, since the seal member 19 reduced in dimensional change irrespective of the type of ink to be used, and achieving sealing properties further accurately is provided, ink leakage and choke of the flow channels are prevented, and thus reliability is improved.

FIGS. 9A to 9C are explanatory drawings of the seal member 19 according to a second embodiment of the invention. FIG. 9A is a top view (the holder flow channel 18 side) of a portion in the vicinity of the elastic portion 43, FIG. 9B is a cross-sectional view of the portion in the vicinity of the elastic portion 43, and FIG. 9C is a bottom view (the case flow channel 21 side) of the portion in the vicinity of the elastic portion 43. In the first embodiment described above, a configuration in which the elastic portions 43 of the seal member 19 have two communicating portions 42 has been exemplified. However, the number of the communicating portions 42 is not limited thereto, and a configuration including three or more communicating portions 42 is also applicable. As the second embodiment, a configuration in which each of the elastic portions 43 themselves has a single independent communicating portion 42 is also applicable. In this configuration, in the case where the seal member 19 is formed by two color molding (injection molding) of the main body portion 44 and the elastic portions 43, the communicating portions 42 are each provided with the gate portion 43a and the bridge portion 43b. In addition, for example, a configuration in which the main body portion 44 is formed of a plate member of a metal such as stainless steel and iron, which is provided with void portions at positions corresponding to the elastic portions 43, and the elastic portions 43 each including only the communicating portion 42 are formed in the void portions of the main body portion 44 by injection molding is also applicable. In this manner, by utilizing each of the elastic portions 43 itself as a single independent communicating portion 42, the main body portion 44 surrounds each of the communicating portions 42 (the elastic portions 43) individually, so that the positional misalignment due to the dimensional change of the communicating portions 42 may be effectively restrained. In the case where the main body portion 44 is the plate member formed of a metal such as stainless steel provided with void portions at the portions corresponding to the elastic portions 43, the rigidity of the main body portion 44 is further increased, and thus the dimensional change of the elastic portions 43 is prevented further reliably.

Figure 10A:
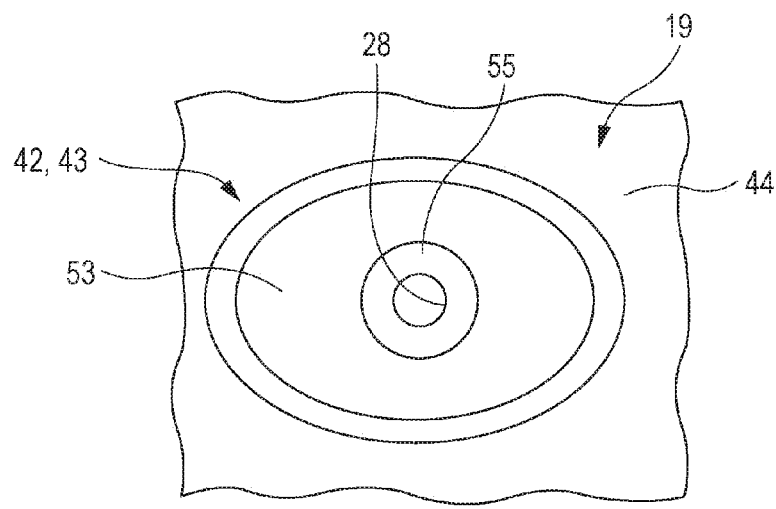
FIGS. 10A to 10C are explanatory drawings of a configuration of the portion in the vicinity of the communicating portion of the seal member in a third embodiment.
Figure 10B:
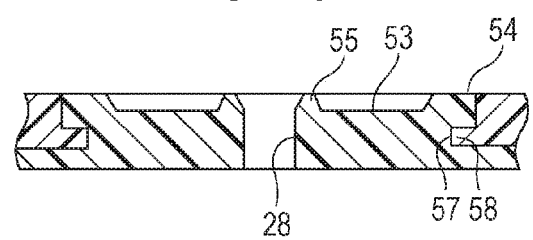
Figure 10C:
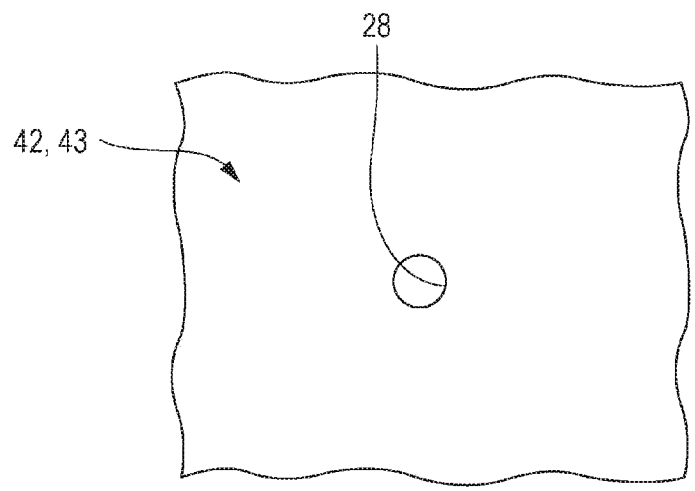

FIGS. 10A to 10C are explanatory drawings of the seal member 19 according to a third embodiment of the invention. FIG. 10A is a top view (the holder flow channel 18 side) of a portion in the vicinity of the elastic portion 43, FIG. 10B is a cross-sectional view of the portion in the vicinity of the elastic portion 43, and FIG. 10C is a bottom view (the case flow channel 21 side) of the portion in the vicinity of the elastic portion 43. Illustration of the gate portion 43a is omitted. In the third embodiment, the communicating portions 42 are formed independently on the upper surface side (the holder flow channel 18 side) of the elastic portions 43, while the lower surface side (the case flow channel 21 side) of the elastic portions 43 is widened into a flange shape to cover the lower surface of the main body portion 44 entirely. In other words, the communicating portions 42 each include the reference portions 45 and are connected thereto with each other on the lower surface side. In this configuration, the elastic portions 43 and the reference portions 45 do not separate from the main body portion 44 easily, and specifically, separation when inserting the positioning pins 35 into the reference holes 51 can be prevented further reliably.

From the same point of view, in the first embodiment described above, a configuration in which the bridge portions 43b of the elastic portions 43 and the bridge portions 45b of the reference portions 45 are provided on the lower surface (first surface) is also applicable. In this configuration, since the bridge portions 43b and 45b function as retainer of the elastic portions 43 and the reference portions 45 with respect to the main body portion 44, respectively, likelihood of separation of the elastic portions 43 and the reference portions 45 from the main body portion 44 may be reduced.

The main body portion 44 needs only to have a configuration in which at least upper and lower surfaces of the communicating portions 42 of the elastic portions 43, that is, portions with which the opening rims of the flow channels 18 and 21 to be sealed come into contact are exposed, and other portions are covered. The configuration of the main body portion 44 is not limited to a configuration in which the entire circumferences of the elastic portions 43 are surrounded, and part of the circumferential surfaces of the elastic portions 43 may be exposed as long as the dimensional change of the elastic portions 43 is restricted and the positional misalignment of the communicating holes 28 is reduced. In addition, as long as at least part of one of the upper and lower surfaces of at least the communicating portions 42 of the elastic portions 43 is covered with the main body portion 44, the elastic portions 43 on the other surface maybe exposed.

In the description given thus far, the seal member 19 configured to seal the flow channels of the ink jet recording head 3, which is a type of the liquid discharge head, has been exemplified. However, the invention is not limited thereto and may be applied to various types of seal members which establish a seal between the liquid flow channels. The seal member of the invention may also be applied, for example, to a color material discharge head used for manufacturing color filters for liquid-crystal displays, or the like, electrode material discharge heads used for forming electrodes for organic EL (Electro Luminescence) displays, FEDs (Face Emitting Displays), and bioorganic substance discharge head used for manufacturing biochips.

What is claimed is:

1. A seal member to be arranged between a first member having a first flow channel and a second member having a second flow channel, comprising:
   an elastic portion formed of an elastically deformable first material, and including at least a communicating portion provided with a communicating hole configured to make the first flow channel and the second flow channel communicate with each other; and
   a main body portion formed of a second material having higher liquid-resistant properties than the first material and configured to surround the elastic portion in a state in which at least a flow channel seal surface of the communicating portion is exposed.

2. The seal member according to claim 1, wherein the second material of the main body portion has higher rigidity than the first material of the elastic portion.

3. The seal member according to claim 1, wherein the main body portion includes a plurality of elastic portions, and surrounds the elastic portions individually.

4. The seal member according to claim 1, further comprising:
   two or more reference portions each having a reference hole which serves as a reference of positioning of the seal member, wherein
   the reference portions are formed of the first material.

5. The seal member according to claim 4, wherein at least part of an outer dimension of the reference portions on a first surface side, which is a side on which the positioning pin is inserted into the reference hole, is preferably set to be larger than an outer dimension on a second surface side, which is opposite to the first surface.

6. The seal member according to claim 5, wherein the reference portions include reference hole portions having the reference holes opened therefrom and an extending portion continuing from the reference hole portion, and the extending portion is arranged on the first surface side.

7. The seal member according to claim 4, wherein the main body portion is provided with a void portion to which a mount reference portion configured to define an orientation of the seal member can be fitted therein, at a position biased to one side in a direction of arrangement of the reference holes.

8. The seal member according to claim 1, wherein a boundary between the communicating portion and the main body portion has a circular shape in plan view.

9. The seal member according to claim 1, wherein one of the elastic portion and the main body portion is provided with a fitting portion and the other one of the elastic portion and the main body portion is provided with a fitted portion at a boundary between the elastic portion and the main body portion.

10. The seal member according to claim 9, wherein
the communicating portion includes a thin portion having a thickness smaller than a thickness of an opening rim of the communicating hole and surrounding the periphery of the opening rim, and an outer peripheral portion having a thickness larger than the thickness of the thin portion and surrounding the periphery of the thin portion, and the fitting portion or the fitted portion is formed on the outer peripheral portion.

11. A liquid discharge head comprising:
member according to claim 1.

12. A liquid discharge head comprising:
member according to claim 2.

13. A liquid discharge head comprising:
member according to claim 3.

14. A liquid discharge head comprising:
member according to claim 4.

15. A liquid discharge head comprising:
member according to claim 5.

16. A liquid discharge head comprising:
member according to claim 6.

17. A liquid discharge head comprising:
member according to claim 7.

18. A liquid discharge head comprising:
member according to claim 8.

19. A liquid discharge head comprising:
member according to claim 9.

20. A liquid discharge apparatus comprising the liquid discharge head according to claim 11.

* * * * *